(12) United States Patent
Ward et al.

(10) Patent No.: US 6,481,271 B1
(45) Date of Patent: *Nov. 19, 2002

(54) METHOD TO CORRECT VEHICLE VIBRATION DURING AN ASSEMBLY PROCESS

(75) Inventors: Kenneth Alan Ward, Ann Arbor, MI (US); Gerard Paul Silka, Dearborn, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/526,376

(22) Filed: Mar. 16, 2000

(51) Int. Cl.$^7$ .............................................. G01M 17/00
(52) U.S. Cl. ....................................... 73/117.3; 701/29
(58) Field of Search .......................... 73/579, 583, 584, 73/587, 588, 598, 600, 662, 801, 117.2, 117.3; 702/33, 34, 35, 36, 39, 56, 105, 113, 182, 183, 184, 185, 188; 701/29, 30, 34, 35, 116

(56) References Cited

U.S. PATENT DOCUMENTS

| | | |
|---|---|---|
| 3,695,098 A | 10/1972 | Kirkland, Jr. |
| 3,748,896 A | 7/1973 | Barrows |
| 3,844,175 A | 10/1974 | Hixson |
| 5,313,407 A | 5/1994 | Tiernan et al. |
| 5,434,783 A | 7/1995 | Pal et al. |
| 5,535,131 A | 7/1996 | Sanders |
| 5,551,298 A | 9/1996 | Rayment |
| 5,641,904 A | 6/1997 | Kopp et al. |
| 5,758,311 A | 5/1998 | Tsuji et al. |
| 6,188,938 B1 * | 2/2001 | Silka et al. .................... 701/29 |

FOREIGN PATENT DOCUMENTS

| | | |
|---|---|---|
| EP | 0 570 229 A2 | 11/1993 |
| EP | 0 710 841 A2 | 5/1995 |
| GB | 2 305 328 A | 4/1997 |
| GB | 2 309 784 A | 8/1997 |
| GB | 2 325 822 A | 12/1998 |

* cited by examiner

*Primary Examiner*—Helen Kwok

(57) ABSTRACT

A method of detecting and correcting vehicle vibration during an assembly process begins by connecting a vibration analyzer to a vehicle through an OBD-II connector. This allows the vibration analyzer to monitor engine rpm, engine type, vehicle speed, vehicle type, and tire size. An operator then drives the vehicle at a full range of speeds in a controlled sequence. While the vehicle is driven, the vibration analyzer detects any vehicle vibration generated. The vibration analyzer then compares the vehicle vibration in conjunction with engine rpm, engine type, vehicle speed, vehicle type, and tire size to several preset thresholds. If the vehicle vibration exceeds one or more of the preset thresholds, then the vibration analyzer will determine a probably cause for the vehicle vibration and generates a cause report. A repair bay operator uses the cause report to correct any unacceptable vehicle vibration. After repairing the vehicle the repair bay operator verifies that the vehicle vibration is gone. A NVH engineer is then notified about the cause report.

18 Claims, 2 Drawing Sheets

METHOD TO CORRECT VEHICLE VIBRATION DURING AN ASSEMBLY PROCESS

TECHNICAL FIELD

The present invention relates generally to automotive assembly methods and, more particularly, to a method to correct vehicle vibration during assembly.

BACKGROUND ART

In order to remain successful, any industry that produces consumer goods must constantly monitor the quality of their products. If the actual or perceived quality of a product is lower than customer expectations, then the customer will find alternative producers of a similar, better quality product. Therefore, it is in the best interest of producers of consumer goods to constantly strive to improve the quality of their products.

Unfortunately, the way in which each consumer perceives quality may vary. Producing a product that fulfills a function without needing repair is only the first step in satisfying today's modern consumer. While designers are successful at making products whose subjective characteristics are perceived by consumers as high quality, it is more difficult to design a product whose objective characteristics are perceived in that same way. For example, the size, weight, or functions of a product are all easily measured and designed into a product; however, the vibrations produced, or color of a product are more subjective. Also, what may seem acceptable to a designer often may not be acceptable to a consumer.

One of these subjective characteristics noticeable to consumers is vibration in an automobile. Vehicle vibration is a major source of customer complaints. Unfortunately, prior art solutions have generally relied on subjective measurements with limited success.

Recent developments in the area of vibration detection have allowed more objective measurements of vehicle vibration. The drawback of these techniques is that they are labor intensive and do not have immediate feedback to repair personnel. These limitations make current vibration detection technologies non-conducive to an assembly plant environment. Also, even after having objective measurements of vehicle vibration, there is almost no data on what forms and types of vibration are most objectionable to the consumer.

The disadvantages associated with conventional vehicle vibration repair techniques have made it apparent that a new technique for detecting and repairing vehicle vibration is needed. The new technique should be able to objectively detect vehicle vibration without significant labor involvement. The new technique should also provide immediate feedback to repair personnel to allow vehicle vibration to be corrected.

SUMMARY OF THE INVENTION

It is an object of the invention to provide an improved and reliable means for detecting and correcting vehicle vibration during an assembly process. Another object of the invention is to reduce the labor required to objectively detect vehicle vibration.

In accordance with the objects of this invention, an improved method of detecting and correcting vehicle vibration is provided. In one aspect of the invention, a method of detecting and correcting vehicle vibration during an assembly process begins by connecting a vibration analyzer to a vehicle through an OBD-II connector. This allows the vibration analyzer to monitor engine rpm, engine type, vehicle speed, vehicle type, and tire size. An operator then drives the vehicle at a full range of speeds in a controlled sequence. While the vehicle is driven, the vibration analyzer detects any vehicle vibration generated. The vibration analyzer then compares the vehicle vibration in conjunction with engine rpm, engine type, vehicle speed, vehicle type, and tire size to several preset thresholds. If the vehicle vibration exceeds one or more of the preset thresholds, then the vibration analyzer will determine a probably cause for the vehicle vibration and generate a cause report. A repair bay operator uses the cause report to correct any unacceptable vehicle vibration. After repairing the vehicle, the repair bay operator verifies that the vehicle vibration is gone. A NVH engineer is then notified about the cause report.

The present invention achieves an improved and reliable means for detecting and correcting vehicle vibration during an assembly process. Also, the present invention is advantageous in that it provides immediate feedback to repair personnel so that the vehicle vibration may be corrected.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
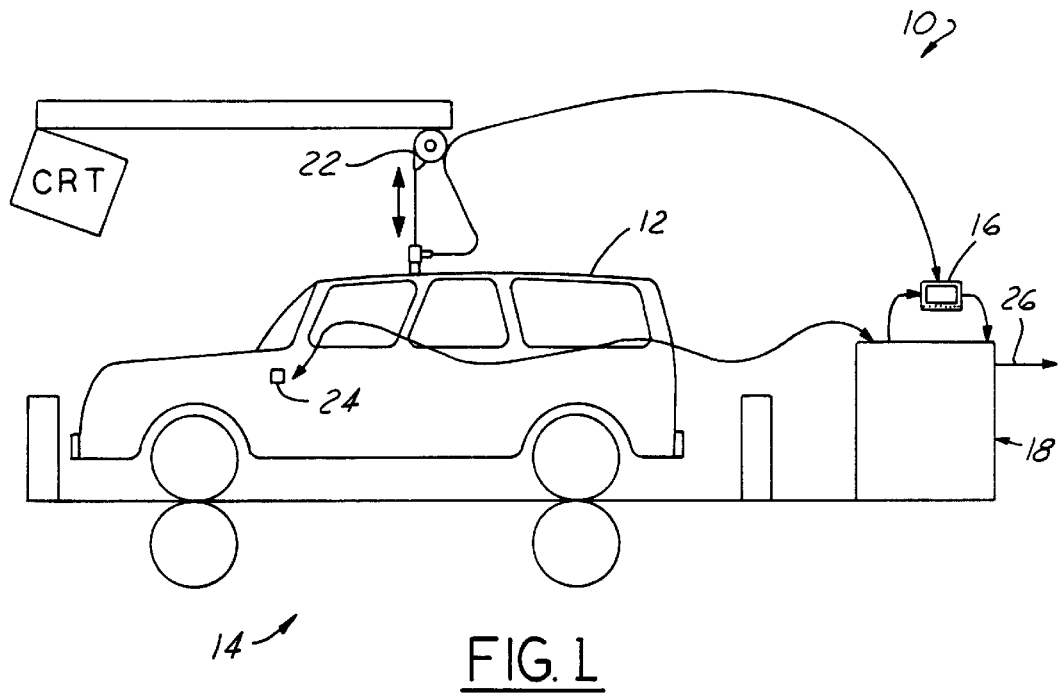
FIG. 1 is a depiction of a system for detecting and correcting vehicle vibration during an assembly process according to one embodiment of the present invention.

Referring to FIG. 1, a system for detecting and correcting vehicle vibration during an assembly process 10 according to one embodiment of the present invention is illustrated. System 10 includes a vehicle 12 located in a roll test station 14. A vibration analyzer 16 is coupled to a roll test computer system 18 and an accelerometer 20.

Accelerometer 20 is coupled to vehicle 12 during operation and is decoupled when not in use. Accelerometer 20 may include a magnetic base or other form of attachment to prevent relative movement between accelerometer 20 and vehicle 12. In the present invention accelerometer 20 is automatically raised and lowered using an air balancer 22, however, one skilled in the art would recognize that various alternative means for coupling and decoupling accelerometer 20 to vehicle 12 exist.

Roll test computer system 18 is connected to the electrical system of vehicle 12 through an OBD-II connector 24 and has access to various vehicle parameters through connector 24 and a connection to a plant broadcast system. These parameters include, but are not limited to, engine type, tire size, engine rpm, vehicle speed, vehicle type (4×2 or 4×4), gear ratios, and tire size. Roll test computer 18 is also connected to a network 26. Network 26 may be a local area network or may include a connection to an Intranet or the Internet.

Vibration analyzer 16 has access to these various vehicle parameters through roll test computer 18. While the present invention is shown using a separate vibration analyzer 16 and roll test computer system 18, one skilled in that art would recognize that they may be integrated into one unit. Vibration analyzer 16 has the capability to do logical concern diagnosis based upon inputs of vehicle parameters, engine rpm, and accelerometer 20. Vibration analyzer 16 reads a vibration signal from accelerometer 20 and does a fast Fourier analysis to determine the various input frequencies and their magnitudes. Vibration analyzer 16 uses engine rpm and gear ratios between rotating components to determine the rotating speed of each of those components. The frequencies from accelerometer 20 are then matched to each rotating component as $½$, $1^{st}$, $2^{nd}$, $3^{rd}$, or $4^{th}$ order multiples of the rotating component speed. Based upon the component each vibration is associated with and the order of the frequency multiple, root causes can then be logically determined. Priority of repair sequence can be assigned by the magnitude of each vibration.

Figure 2:
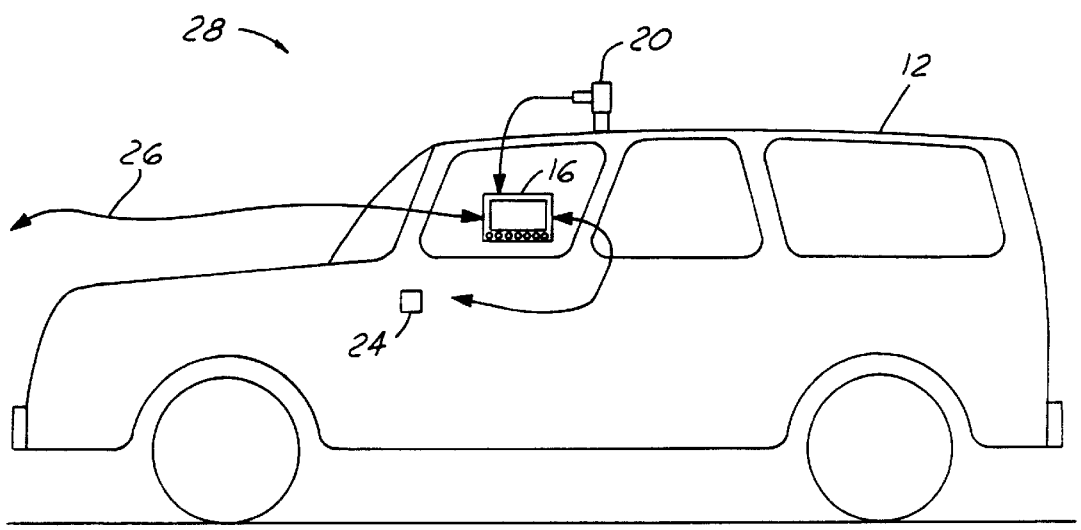
FIG. 2 is a depiction of a system for detecting and correcting vehicle vibration during a repair process according to one embodiment of the present invention.

Referring to FIG. 2, a depiction of a system for detecting and correcting vehicle vibration during a repair process 28 according to one embodiment of the present invention is illustrated. System 28 includes a vehicle 12 coupled to a vibration analyzer 16 through an OBD-II connector 24. Vibration analyzer 16 has the capability to do logical concern diagnosis based upon inputs of vehicle parameters, engine rpm, and accelerometer 20.

Vibration analyzer 16 is connected to a network 26. Network 26 may be a local area network or may include a connection to an Intranet or the Internet. Accelerometer 20 is coupled to vehicle 12 during operation and is decoupled when not in use. Accelerometer 20 may include a magnetic base or other form of attachment to prevent relative movement between accelerometer 20 and vehicle 12.

Figure 3:
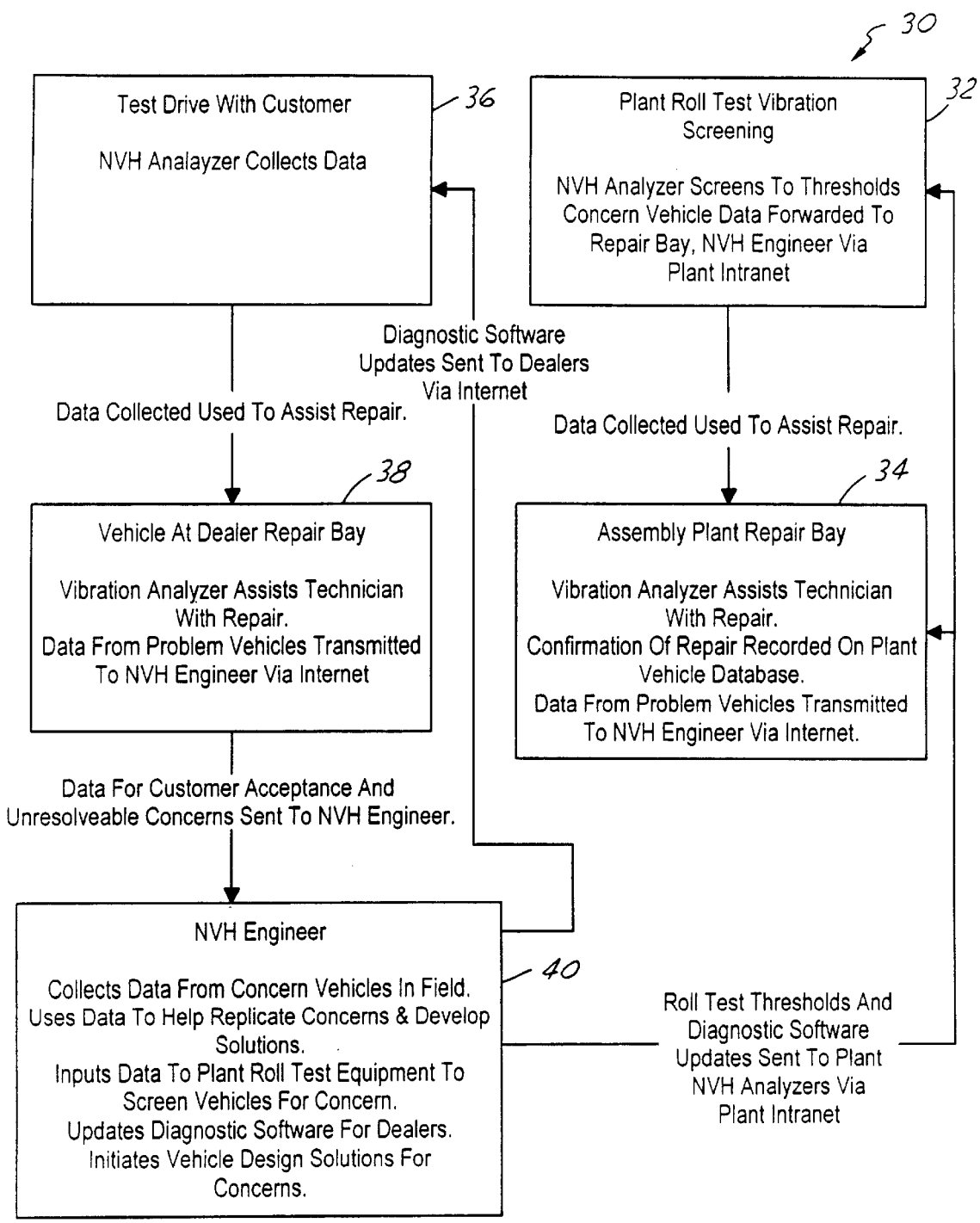
FIG. 3 is a block diagram of a method for detecting and correcting vehicle vibration during an assembly process and customer repair process according to one embodiment of the present invention.

Referring to FIG. 3, a block diagram of a method 30 for detecting and correcting vehicle vibration during an assembly process and customer repair process according to one embodiment of the present invention is illustrated. In operation, the sequence begins with step 32. At the start of the roll test cycle, vehicle 12 is driven into roll test station 14. An operator hooks up the connection between OBD-II connector 24 and roll test computer system 18, and starts the test cycle. Roll test computer system 18 then transfers the vehicle parameters to vibration analyzer 16 and lowers accelerometer 20 onto vehicle 12 while vibration analyzer 16 begins collecting data. During the course of a roll test, vehicle 12 is operated over a full range of speeds in a controlled sequence. Vibration analyzer 16 compares vibration readings during the roll test to one or more preset thresholds. If vibrations during the roll test did not exceed one of these thresholds, then vibration analyzer 16 would generate a pass signal for roll test computer system 18. If vibration during the roll test exceeded one of these thresholds, then vibration analyzer 16 would generate a fail signal for roll test computer system 18 to generate a cause report. The cause report includes magnitude of the vibration in question, what engine rpm it occurred at, vehicle parameters, and likely cause. Vibration analyzer 16 then transfers the cause report to a networked computer for future reference. At the conclusion of the test cycle, the operator removes the hook up to OBD-II connector 24, and roll test computer system 18 removes accelerometer 20.

The sequence then proceeds to step 34. To repair a vehicle, a repair person would access the cause report from the networked computer. The information for a given vehicle would be identified by a vehicle identification number (VIN). The repair person then makes repairs as determined by vibration analyzer 16. In the repair station, accelerometer 20 is manually placed on vehicle 12 by the repair person, and vibration analyzer 16 is connected to OBD-II connector 24 to obtain engine rpm data. Repairs are verified with repair vibration analyzer 16, either in the repair station or by road testing if required. Repaired vehicle data and confirmation by vehicle analyzer 16 that vehicle 12 has been repaired is then stored on the networked computer for access by a NVH engineer.

The sequence then proceeds to step 40. The cause report is sent to an NVH engineer where it is analyzed to provide feedback to the vibration analyzer 16 and design engineers for possible future use concerning other vehicles.

The method and system of the present invention reduce the labor required to objectively detect vehicle vibration. The present invention, also, provides immediate feedback to repair personnel so that the vehicle vibration may be corrected. Additionally, because a NVH engineer receives all vibration cause reports, long term design actions may taken to permanently correct any recurring vibration problems.

In another aspect of the invention, the information sent to the NVH engineer can be supplemented with step 36. The method of incorporating customer feedback into correcting vehicle vibration begins by interviewing a vehicle owner concerning an objectionable vehicle vibration. The dealer then connects a vibration analyzer to the vehicle with the objectionable vibration through an OBD-II connector. This allows the vibration analyzer to monitor engine rpm, engine type, vehicle speed, vehicle type, and tire size. The dealer then drives the vehicle at a full range of speeds in a controlled sequence with the vehicle owner to reproduce the objectionable vehicle vibration.

The sequence then proceeds to step 38. While the vehicle is driven, the vibration analyzer detects any vehicle vibration generated. The vibration analyzer then compares the vehicle vibration in conjunction with engine rpm, engine type, vehicle speed, vehicle type, and tire size when the vehicle owner identifies the objectionable vibration. The vibration analyzer then determines a probable cause for the vehicle vibration and generates a cause report. The dealer uses the cause report to correct the objectionable vehicle vibration.

From the foregoing, it can be seen that there has been brought to the art a new and improved method to correct vehicle vibration during an assembly process. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A method of detecting and correcting vehicle vibration during an assembly process comprising the steps of:

coupling a vehicle to a vibration analyzer, whereby said vibration analyzer has access to vehicle data;

operating said vehicle;

detecting said vehicle vibration generated while said vehicle is operating;

comparing said vehicle vibration to a preset threshold;

determining a cause of said vehicle vibration as a function of said vehicle data if said vehicle vibration exceeds said preset threshold;

repairing said vehicle to correct said vehicle vibration based upon said cause; and verifying that said vehicle vibration has been repaired.

2. The method of detecting and correcting vehicle vibration during an assembly process as recited in claim 1, wherein the step of coupling comprises:

connecting said vibration analyzer to a vehicle OBD-II connector, whereby said vibration analyzer has access to engine rpm, engine type, vehicle speed, vehicle type, and tire size; and coupling an accelerometer to said vehicle, whereby said accelerometer generates a vibration signal and is coupled to said vibration analyzer.

3. The method of detecting and correcting vehicle vibration during an assembly process as recited in claim 2, wherein the step of determining a cause comprises determining at least one cause of said vehicle vibration as a function of said engine rpm, engine type, vehicle speed, vehicle type, tire size and said vibration signal if said vehicle vibration exceeds at least one preset threshold.

4. The method of detecting and correcting vehicle vibration during an assembly process as recited in claim 3, further comprising the step of generating a cause report, wherein said cause report includes said engine rpm, engine type, vehicle speed, vehicle type, tire size and said vibration signal if said vehicle vibration exceeds at least one preset threshold.

5. The method of detecting and correcting vehicle vibration during an assembly process as recited in claim 1, wherein the step of operating comprises operating said vehicle at a full range of speeds in a controlled sequence.

6. The method of detecting and correcting vehicle vibration during an assembly process as recited in claim 1, further comprising the step of driving said vehicle into a roll test station.

7. The method of detecting and correcting vehicle vibration during an assembly process as recited in claim 1, further comprising the step of generating a cause report as a function of said cause, whereby said cause report includes said vehicle data and said cause.

8. The method of detecting and correcting vehicle vibration during an assembly process as recited in claim 7, further comprising the step of storing said cause report on a networked computer.

9. The method of detecting and correcting vehicle vibration during an assembly process as recited in claim 8, further comprising the step of reading said cause report from said networked computer.

10. The method of detecting and correcting vehicle vibration during an assembly process as recited in claim 9, wherein said networked computer is coupled to an intranet.

11. The method of detecting and correcting vehicle vibration during an assembly process as recited in claim 9, wherein said networked computer is coupled to an internet.

12. The method of detecting and correcting vehicle vibration during an assembly process as recited in claim 1, further comprising the step of driving said vehicle into a repair station.

13. The method of detecting and correcting vehicle vibration during an assembly process as recited in claim 1, further comprising the step of coupling said vehicle to a repair vibration analyzer to verify that said vehicle vibration has been repaired.

14. The method of detecting and correcting vehicle vibration during an assembly process as recited in claim 1 further comprising the step of decoupling said vehicle from said vibration analyzer.

15. The method of detecting and correcting vehicle vibration during an assembly process as recited in claim 14, wherein the step of decoupling comprises:

disconnecting said vibration analyzer from a vehicle OBD-II connector; and decoupling an accelerometer from said vehicle.

16. The method of detecting and correcting vehicle vibration during an assembly process as recited in claim 1, further comprising the step of storing a confirmation of repair on a networked computer.

17. The method of detecting and correcting vehicle vibration during an assembly process as recited in claim 1, further comprising the step of transferring said cause to a NVH engineer.

18. A method of detecting and correcting vehicle vibration during an assembly process comprising the steps of:

driving a vehicle into a roll test station;

connecting a vibration analyzer to a vehicle OBD-II connector, whereby said vibration analyzer has access to engine rpm, engine type, vehicle speed, vehicle type, and tire size;

coupling an accelerometer to said vehicle, whereby said accelerometer generates a vibration signal;

operating said vehicle at a full range of speeds in a controlled sequence;

detecting said vehicle vibration generated while said vehicle is operating as a function of said vibration signal;

comparing said vehicle vibration in conjunction with said engine rpm, engine type, vehicle speed, vehicle type, and tire size to at least one preset threshold;

determining a cause of said vehicle vibration as a function of said engine rpm, engine type, vehicle speed, vehicle type, and tire size if said vehicle vibration exceeds said at least one preset threshold;

generating a cause report, wherein said cause report includes said engine rpm, engine type, vehicle speed, vehicle type, tire size and said vibration signal if said vehicle vibration exceeds at least one preset threshold;

storing said cause report on a networked computer;

disconnecting said vibration analyzer from said vehicle OBD-II connector;

decoupling said accelerometer from said vehicle;

driving said vehicle into a repair station;

reading said cause report from said networked computer;

repairing said vehicle to correct said vehicle vibration based upon said cause report;

coupling said vehicle to a repair vibration analyzer to verify that said vehicle vibration has been repaired;

verifying that said vehicle vibration has been repaired;

storing a confirmation of repair on said networked computer; and transferring said cause report to a NVH engineer.

* * * * *